United States Patent
Sherry (10) Patent No.: US 10,125,677 B1
(45) Date of Patent: Nov. 13, 2018

(54) ENGINE MOUNT FOR EASY INSTALLATION AND REMOVAL OF ENGINE

(71) Applicant: Raymond C. Sherry, Cleburne, TX (US)

(72) Inventor: Raymond C. Sherry, Cleburne, TX (US)

( * ) Notice: Subject to any disclaimer, the term of this patent is extended or adjusted under 35 U.S.C. 154(b) by 508 days.

(21) Appl. No.: 14/868,565

(22) Filed: Sep. 29, 2015

Related U.S. Application Data (60) Provisional application No. 62/071,929, filed on Oct. 6, 2014.

(51) Int. Cl.
| | |
|---|---|
| F02B 63/04 | (2006.01) |
| F02F 7/00 | (2006.01) |
| H02K 7/18 | (2006.01) |
| H02K 7/10 | (2006.01) |
| H02K 5/04 | (2006.01) |
| H02K 7/02 | (2006.01) |
| H02K 7/00 | (2006.01) |
| H02K 15/00 | (2006.01) |

(52) U.S. Cl.
CPC .......... *F02B 63/044* (2013.01); *F02B 63/042* (2013.01); *F02F 7/0082* (2013.01); *H02K 5/04* (2013.01); *H02K 7/003* (2013.01); *H02K 7/02* (2013.01); *H02K 7/1008* (2013.01); *H02K 7/1815* (2013.01); *H02K 15/0006* (2013.01); *F02B 2063/045* (2013.01)

(58) Field of Classification Search
CPC .............................. F02B 63/044; F02B 63/042
See application file for complete search history.

(56) References Cited

U.S. PATENT DOCUMENTS

| | | | | |
|---|---|---|---|---|
| 3,881,619 A | * | 5/1975 | Morris | B62D 53/0828 188/67 |
| 4,571,936 A | | 2/1986 | Nash et al. | |
| 4,741,676 A | * | 5/1988 | Janes | F02B 63/06 123/195 A |
| 6,390,489 B1 | * | 5/2002 | Friesen | B60D 1/06 187/237 |
| 7,294,938 B2 | * | 11/2007 | Miyao | B60K 6/30 180/65.285 |
| 7,471,000 B1 | * | 12/2008 | Ruiz | H02J 7/1415 290/1 A |
| 8,935,995 B1 | * | 1/2015 | Hawkins | F02B 63/048 123/2 |
| 2005/0087990 A1 | * | 4/2005 | Henry | F01L 1/34 290/38 R |
| 2005/0151374 A1 | * | 7/2005 | Ambrose | B23K 9/323 290/1 A |

(Continued)

*Primary Examiner* — Viet Nguyen
(74) *Attorney, Agent, or Firm* — Roger N. Chauza, PC (57) ABSTRACT

A technique for mounting an engine to a frame so that it is coupled to a load, such as a generator, but the mounting apparatus allows the engine to be disconnected quickly and removed from the frame so that a replacement engine can be installed in the frame. A removable rear engine mount houses an engine pulley and a belt that connects the engine pulley to a generator pulley. During removal of the engine, the front and rear engine mounts are disconnected, and the engine assembly including the rear engine mount and the engine pulley and belt are lifted somewhat and then laterally removed from the generator which remains connected to the frame.

20 Claims, 5 Drawing Sheets

(56) References Cited

U.S. PATENT DOCUMENTS

| | | | |
|---|---|---|---|
| 2007/0145749 A1* | 6/2007 | Holmes | B60K 6/365 290/45 |
| 2007/0228735 A1* | 10/2007 | Becker | F02D 29/06 290/40 C |
| 2009/0097974 A1* | 4/2009 | Ippolito | B63H 9/0685 416/31 |
| 2009/0236860 A1* | 9/2009 | Raasch | F02D 29/06 290/40 B |
| 2009/0263259 A1* | 10/2009 | Picton | H02K 7/1815 417/364 |
| 2010/0072757 A1* | 3/2010 | Kealy | F01N 13/04 290/1 A |

* cited by examiner

ENGINE MOUNT FOR EASY INSTALLATION AND REMOVAL OF ENGINE

RELATED APPLICATIONS

This non-provisional patent application claims the benefit of U.S. provisional patent application No. 62/071,929, filed Oct. 6, 2014, entitled "Engine Mount for Easy Installation and Removal of Engine."

TECHNICAL FIELD OF THE INVENTION

The present invention relates in general to mounting apparatus, and more particularly to engine mounts for allowing easy installation and removal of the engine.

BACKGROUND OF THE INVENTION

Internal combustion engines are employed to generate torque for driving loads of many types. Gasoline and diesel engines are available for driving generators to provide emergency electrical power to hospitals, as well as in industrial situations where power is essential in the event the grid power is interrupted. Similarly, many farmers, including dairy farmers, require a reliable source of electrical power in order to milk cows and safely store the milk for delivery to a processing center.

Portable engines are also available for use with pumps and other equipment for allowing the equipment to operate at remote areas where electrical power is otherwise not readily available. Electrical generator and engine combinations are also often used at remote well sites where exploratory drilling operations are carried out to find oil or gas.

Portable engine and generator equipment is often marketed as a unit so that there is no substantial connections necessary at the remote site, except for a source of fuel and connections to the electrical load. Otherwise, the generator unit need only be powered up to supply electrical power to the load. Depending on the kilowatts of energy supplied by the generator unit, the engines may be required to deliver 200-400 horsepower, and more. This size and weight of the engine cannot be handled by workmen without lifting equipment, and thus field repair is either often not possible, or is very cumbersome. As such, if the engine or generator of the unit should fail, then the only recourse is to ship the defective unit back to the manufacturer for repair, and have a replacement unit brought to the remote site. This is obviously time consuming, and in the meantime there may not be any electrical energy available, unless alternate units are readily available, or the load must be shared with other working units. One could have spare generator units at the remote site to take over for the defective generator unit, but this alternative is expensive. The availability of one or more spare generator units may be the only solution, if an interruption in the delivery of electrical power would result in a costly disruption.

While gasoline and diesel engines, as well as propane gas engines, are well developed and generally reliable, there are many working parts that can fail and render the generator unit unusable. Even a good program of maintenance for engines does not guarantee a long and reliable life. The fuel for internal combustion engines can be contaminated or fail to provide sufficient lubrication to the valves and cause the engine to fail. Timing chains, spark plugs, valves, etc., can fail, as well as any of the electrical components that control the operation of the engine. Where the environment is harsh, such as very hot or cold locations, or those areas of high humidity or dust conditions, the life of an engine is correspondingly shortened. Often the useful life of an engine is disregarded and the operator runs the engine until it fails. This could be avoided by replacing the engine when it nears the end of its useful life.

From the foregoing, it can be seen that a need exists for a technique and apparatus that allows for quick and easy replacement of an engine from a unit so that operations can be continued after a short period of interruption.

SUMMARY OF THE INVENTION

In accordance with the principles and concepts of the invention, there is disclosed an engine mounting apparatus that provides adjustability of the engine with respect to its mechanical or electrical load, as well as provides a quick and simple connect and disconnect of the engine with respect to a frame.

In accordance with one embodiment of the invention, disclosed is an engine mount that includes a pair of turnbuckles utilized as front engine mounts to a frame. The rear of the engine is mounted to the frame using spring-biased means to clamp the engine under spring pressure to the frame. The degree of compression of the spring of the rear engine mount also tensions a drive belt that connects an engine pulley to the load pulley.

In accordance with another feature of the invention, the adjustability of the frontal turnbuckles allows the position of the front part of the engine to be moved both sideways and in a vertical direction in order to align the engine with the load to be driven.

According to a further feature afforded by the invention, a pair of lift rails is attached to the engine. The lift rails comprise a pair of horizontal tubular members attached to the engine block by respective arms. Once the engine is disconnected from the frame of the unit, a forklift can use rod-like tines inserted into the tubular members to lift the entire engine and remove it from the frame.

According to an embodiment of the invention, disclosed is an engine and electrical generator unit which includes a frame to which the engine is fastened and to which the generator is fastened. The electrical generator has a shaft to which a first rotatable driver it attached, where the rotatable driver rotates the shaft of the electrical generator. The engine has a drive shaft for generating a torque. A cage is attached to a rear part of the engine and the cage is removably attached to the frame. The cage houses a second rotatable driver that is rotated by the torque of the engine drive shaft. The cage can be removed from the frame to allow disengagement of the engine from the electrical generator. A drive connector connects the first rotatable driver to the second rotatable driver so that the engine drives the electrical generator. A frontal engine mount is for mounting a front of the engine to the frame, and the frontal engine mount is adapted for allowing removal of the front of the engine from the frame.

With regard to a further embodiment, disclosed is a method for removing an engine from an electrical generator, each fastened to a common frame. The method of this embodiment includes connecting a lifter mechanism to the engine so that the engine can be lifted and moved. A frontal engine mount is disconnected so that the engine is disconnected from the frame, and a rear engine mount is disconnected from the frame while suspending the engine by the lifter mechanism. The rear engine mount houses a rotatable driver connected to a crankshaft of the engine, where the rotatable driver is driven by a belt or chain for driving the generator. The engine is lifted sufficiently to remove tension from the belt or chain so that the belt or chain can be disconnected from a corresponding rotatable driver connected to a shaft of the electrical generator. The generator is left connected to the frame. The lifter mechanism is laterally moved so that the engine and rear engine mount and corresponding engine driver and belt or chain are also moved laterally with the engine away from the electrical generator. The engine can then be removed from the frame without disconnecting the generator from the frame.

According to another embodiment, disclosed is apparatus for mounting an engine to a frame for driving a generator having a pulley. The apparatus includes a frame providing a rigid structure for carrying the engine and the generator. The engine has a bell housing attached to a back part of the engine, and the bell housing houses a clutch for driving an engine pulley. A drive belt transfers torque from the engine pulley to the generator pulley. A first turnbuckle provides attachment between a frontal part of the engine and the frame. A second turnbuckle provides attachment between a frontal part of the engine and the frame. The first and second turnbuckles are angled from the frame to the frontal part of the engine, whereby adjustment of the first and second turnbuckles can move the frontal part of the engine laterally sideways and upwardly and downwardly. A first and second spring-biased mount spring bias the rear part of the engine toward the frame without rigidly mounting the rear part of the engine to the frame. The first and second spring-biased mount include a threaded bolt having an end that is pivotally anchored to the frame. The spring-biased mount includes a compression spring encircling the threaded bolt so that when the spring is compressed the drive belt is tensioned.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
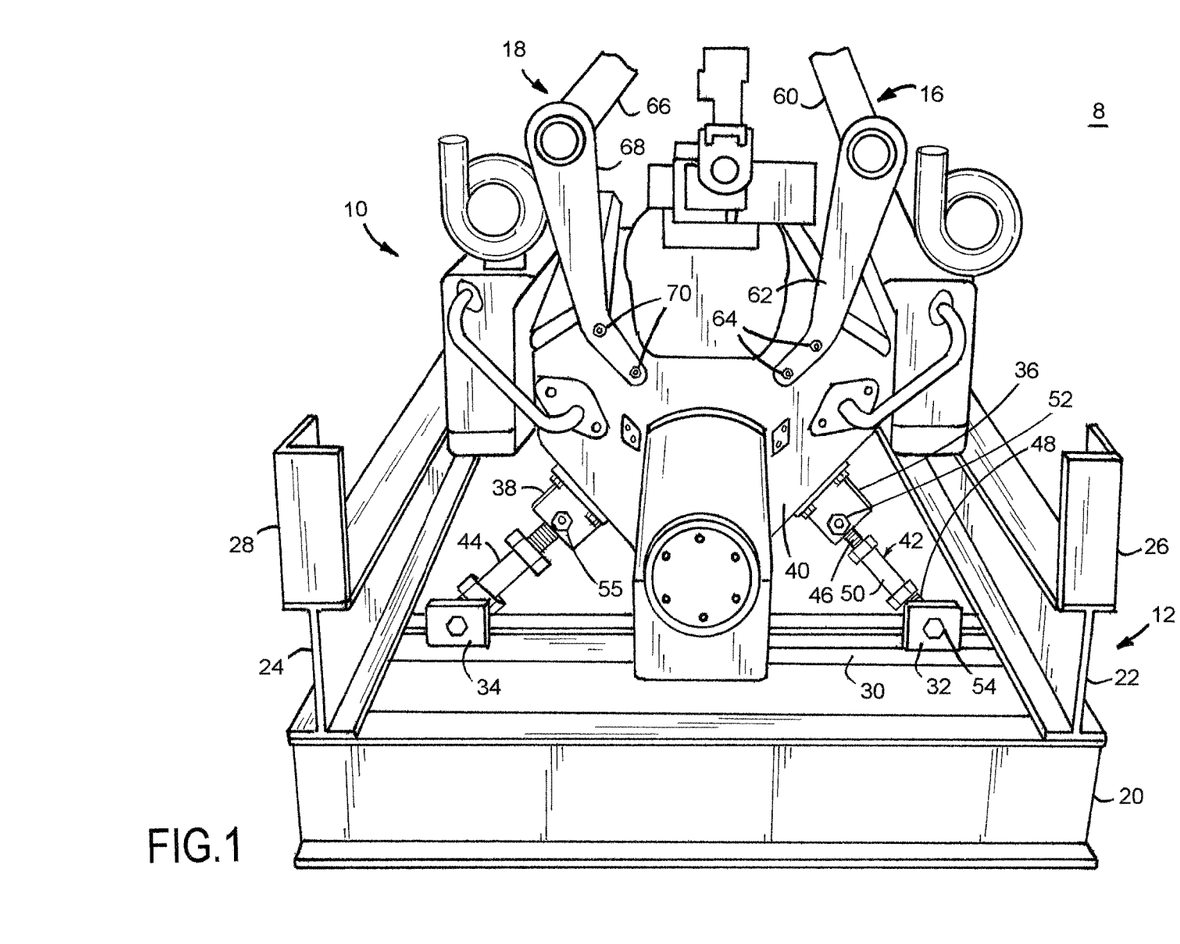
FIG. 1 is a frontal view of an engine showing the front engine mounting apparatus.
Figure 2:
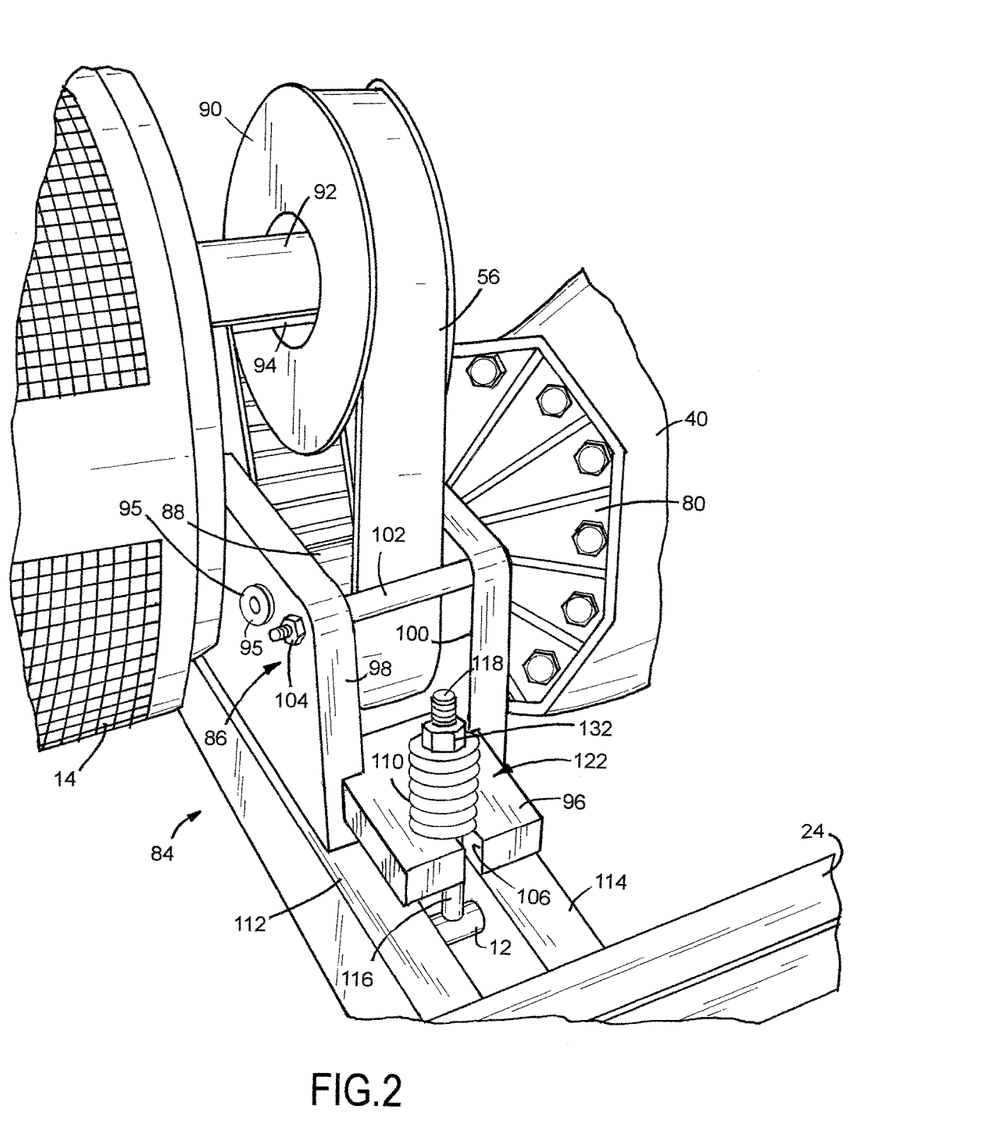
FIG. 2 is an isometric view of a portion of the engine showing a left rear engine mounting apparatus.
Figure 4:
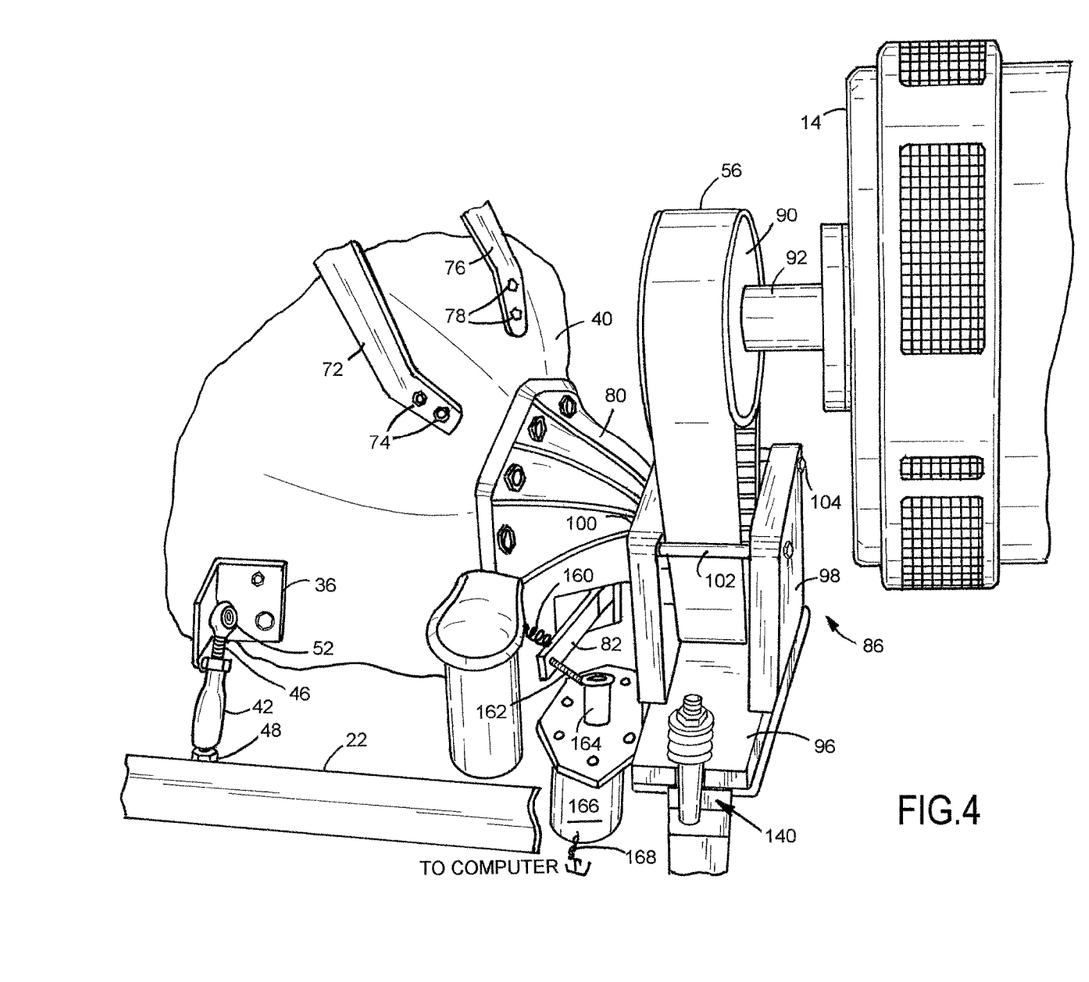
FIG. 4 is an isometric view of a portion of the engine showing the right rear engine mounting apparatus, as well as the clutch engaging apparatus.

With reference to FIGS. 1, 2 and 4, there is illustrated a generator unit 8 comprising an internal combustion engine 10 and an electrical generator 14 that are rigidly mounted to a heavy duty metal frame 12. The generator unit 8 is portable and can be moved to a remote location for operation. An electrical generator 14 (shown in other figures) comprises a load that is driven by the engine 10. The engine 10 can be fueled by gasoline, diesel, hydrogen, propane, natural gas or any other suitable type of fuel. As will be described in more detail below, the engine 10 can be lifted by the use of a pair of lift rails 16 and 18, each of which are bolted to the engine 10 by respective arms. As used herein, the terms "left" and "right" are as seen from the front of the engine 10, as illustrated in FIG. 1.

The frame 12 can be constructed with many different configurations, other than that illustrated. In one embodiment, the frame 12 includes a frontal I-beam type of cross beam 20, as does the back end of the frame 12. I-beam side supports 22 and 24 are welded to the frontal cross beam 20 as well as the back cross beam. Upright metal corner supports 26 and 28 are fastened to the side supports 22 and 24. While not shown, the top of the heavy duty metal frame 12 also includes sturdy metal supports so that the entire unit can be lifted by a cable, chain or the like. The generator unit 8 would typically be covered with a metal cover to protect the internal components from the weather. The unit can also be lifted with a forklift, or other similar device, to move it short distances, or to unload the generator unit 8 from a truck or trailer.

Fastened between the side supports 22 and 24 is a frontal engine mount support 30. The frontal engine mount support 30 supports a portion of the weight of the engine 10. Welded to the frontal engine mount support 30 is a pair of brackets 32 and 34. Each bracket 32 and 34 is constructed using a respective short section of angle iron. A similar pair of angle iron brackets 36 and 38 is bolted to the respective sides of the engine block 40.

The frontal part of the engine 10 is supported by the frame 12 of the generator unit 8 using two turnbuckles 42 and 44. Each turnbuckle 42 and 44 is of the type having a closed eye at each end. Typically, such turnbuckles are constructed with the eye connected to a respective threaded rod, where one threaded rod has right-hand threads, and the other threaded rod has left-hand threads. For example, turnbuckle 42 includes threaded rod 46 and oppositely located threaded rod 48, each of which is threaded into a barrel 50. The barrel 50 includes internal right-hand threads at one end and internal left-hand threads at the other end. With this arrangement, when the barrel 50 is rotated in one direction, the overall length of the turnbuckle 42 increases, and when the barrel 50 is rotated in the other direction the overall length of the turnbuckle 42 decreases. When the desired length of the turnbuckle 42 is achieved, the threaded rods 46 and 48 can be locked to the respective ends of the barrel 50 with lock nuts.

In order to make the front of the engine 10 easily connected to the frame 12, the top eye of the turnbuckle 42 is fastened with a bolt 52 to the engine block bracket 36, and the bottom turnbuckle eye is fastened with a bolt 54 to the frame engine mount bracket 32. The other turnbuckle 44 is similarly constructed and fastened between the engine block bracket 38 and the frame engine mount bracket 34. In order to disconnect the frontal part of the engine 10 from the frame 12, all that is needed is to remove the two bolts 52 and 55 to disconnect to the top ends of the turnbuckles 42 and 44 from the engine block 40. In the preferred embodiment, no rubber or cushioning members are used in fastening the turnbuckle eyes to either of the block brackets 36 and 38, or the frame brackets 32 and 34. Pins can be used instead of the bolts 52 and 55, where wire clips are either inserted into holes formed through the end of the pins, or into annular grooves formed around the ends of each pin.

By using turnbuckles 42 and 44 as engine mounting apparatus, the engine 10 can be easily and accurately adjusted to a desired left or right position, as well as the correct vertical position. When the turnbuckle 42 is adjusted to effectively increase its length, then the engine 10 can be moved either to the left, or upwardly, or both. The other turnbuckle 44 can be adjusted in a similar manner. In practice, both turnbuckles 42 and 44 will be adjusted to vary the respective overall lengths and achieve a desired position of the engine 10 with respect to both the frame 12 and the generator 14 which is driven by the engine 10 with a drive belt 56. A replacement engine can be installed and the frontal part thereof fastened to the frame 12 by simply reattaching the top eyes of the turnbuckles 42 and 44 to the respective engine block brackets 36 and 38. Some minor readjustment of the turnbuckles 42 and 44 may be required to realign the replacement engine 10 to the generator 14. The engine block brackets 36 and 38 can be more accurately fastened to the block 40 using bolts, each with a round shoulder at the head end of the bolt, and a respective bore in the bracket that fits snugly around the shoulder of the bolt. This assures that from one engine 10 to another, the brackets 36 and 38 are accurately located on the engine 10 and less realignment is required during replacement of the engine 10.

FIG. 1 also illustrates a portion of the lift rail system for lifting the engine 10 and removing it from the frame 12. As noted above, the lift rail system includes a first lift rail 16 and a second lift rail 18, both of which are attached to the block 40 of the engine 10. The lift rail 16 includes a horizontal tubular member 60 welded to a frontal arm 62. The bottom of the frontal arm 62 is bolted to the right front end of the engine block 40 by bolts 64. In this manner, the horizontal tubular member 60 is elevated somewhat above the top of the engine 10. The other lift rail 18 is similarly constructed with a horizontal tubular member 66 welded to a frontal arm 68. The bottom of the frontal arm 68 is bolted to the left front end of the engine block 40 with bolts 70. As will be described in more detail below, lateral rod-like lift arms or tines of a forklift, or the like, can be slid into the horizontal tubular members 60 and 66 to lift the engine 10 and move it forwardly and horizontally out of the frame 12.

Figure 5:
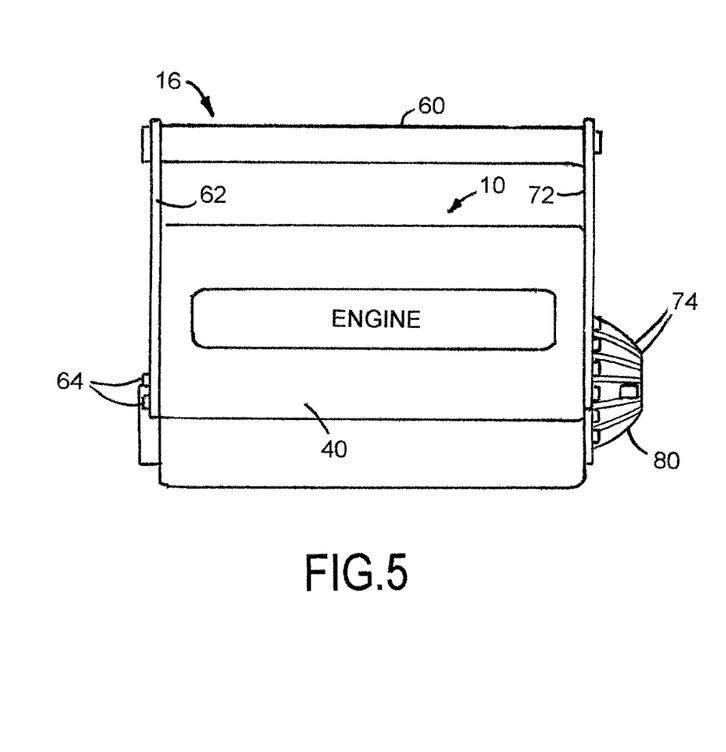
FIG. 5 is a side view of the lifting rails which support the engine during installation or removal thereof.

Referring now to FIG. 4 of the drawings, it can be seen that the rear end of each of the horizontal tubular members 66 and 60 are attached to corresponding arms 72 and 76. The bottom end of each of the rear arms 72 and 76 are bolted to the rear part of the engine block 40 with respective bolts 74 and 78. FIG. 5 illustrates a side view of the engine 10 with the right lift rail 16 which is fastened to the front and back of the block 40 via arms 62 and 72. It can be seen that the pointed ends of rod-like tines of a forklift can be inserted into the horizontal tubular member 60, and into the other horizontal tubular member 66 so that the engine 10 (once disconnected from the frame 12) can be lifted and removed from the frame 12.

While the lift rail system in the embodiment shown in detail includes two parallel horizontal tubular members 60 and 66, those skilled in the art may prefer to use a single horizontal tubular member that is attached to both the front and back of the engine block 40 to lift it from the frame 12. Other alternatives can be utilized to remove the engine 10 from the frame 12. For example, the arms 62 and 72 of horizontal tubular member 60 can be replaced with respective lengths of a chain, and the same substitution can be accomplished with the other set of arms 68 and 76. By using chains or cables instead of arms, the alignment of the forklift tines with the horizontal tubular members 60 and 66 is less critical.

Figure 3:
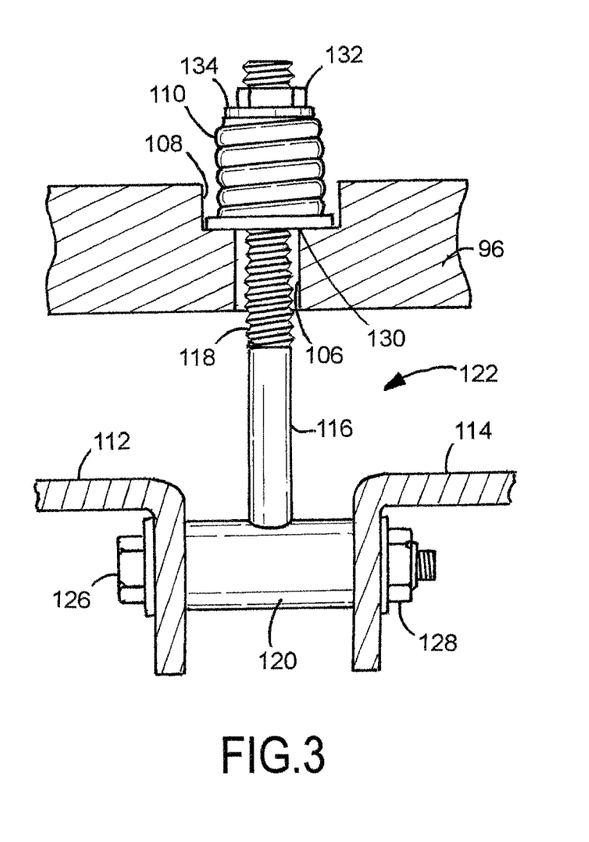
FIG. 3 is an enlarged partial sectional view of the details of the rear engine mounting apparatus.

With reference to FIGS. 2 and 3, there is illustrated the manner in which the back of the engine 10 is mounted to the frame 12. Bolted to the back of the engine block 40 is a bell housing 80 for housing therein a conventional double-plate friction clutch (not shown). The clutch can be engaged and disengaged by moving a lever 82 (FIG. 4). Bolted to the back of the bell housing 80 is a rear frame support assembly 84 having lateral ends that are fastened to the frame 12 by two spring-loaded bolt arrangements 122 and 140. The details of the spring-biased rear engine mount 122 are shown in FIG. 3. The rear frame support 84 includes a cage 86 that has spaced-apart plates 98 and 100. The frontal plate 100 is bolted to the back of the bell housing 80. The front plate 100 of the cage 86 has a bore therein with a bearing through which the back end of a drive shaft from the clutch extends. The back end of the shaft is supported by a bearing 95 fixed in the back plate 98 of the cage 86. The tops of the front and back plates 100 and 98 are fixed together in a spaced-apart relationship by spacer tubes, one of which is shown as numeral 102. The spacers 102 are sandwiched together between the front plate 100 and the back plate 98 with respective bolts 104.

An engine drive pulley 88 is fastened to the drive shaft of the engine 10 with a key and taper lock bushings. The drive pulley 88 is of the type that has ribs for engagement with the ribbed inner surface of the drive belt 56. The drive belt 56 is routed around a similarly-constructed driven pulley 90 that is fixed to a shaft 92 of the generator 14. The generator pulley 90 is fastened to the generator shaft 92 via a key 94 and taper lock bushings. The diameters of the pulleys 88 and 90 are such that when the engine is running at about 2400 rpm, the generator rotates at 1800 rpm. The generator 14 is rigidly mounted to the frame 12 by bolts and frame members not shown. Instead of using a set of pulleys 88 and 90 and a ribbed drive belt 56, those skilled in the art may find it advantageous to use a pair of sprocket gears and a drive chain. The drive mechanism between the generator 14 and the engine 10 can also be V-belt pulleys and multiple V-belts.

Welded or bolted to the cage 86 is a lateral plate member 96 having a slot 106 formed therein. The top of the slot 106 terminates in a circular recessed area 108 (FIG. 3) for receiving therein the bottom end of a spring 110. The lateral plate member 96 is compressed downwardly by the spring 110 toward the frame members 112 and 114 which are rigidly attached between the I-beams 22 and 24. A threaded rod 116 compresses the lateral plate member 96 toward the frame members 112 and 114 through the spring 110 in the following manner. The bottom of the threaded rod 116 is welded to a lateral pipe 120 that fits between the downwardly depending parts of the frame members 112 and 114. A bolt 126 passes through a hole in the frame member 112, through the lateral tube 120, and through the other frame member 114. A nut 128 secures the bolt 126 in place. The bottom of the threaded rod 116 is thus anchored to the frame members 112 and 114, but is rotatable about the bolt 126.

The threaded top 118 of the rod 116 can be rotated into the slot 106 of the lateral plate member 96. A washer 130 is then placed down over the threaded top end of the rod 116 so that it rests on the bottom of the recessed area 108. Next, the spring 110 is inserted over the top end of the threaded end 118 of the rod 116 until it rests on the washer 130. Lastly, a washer 134 is placed on the top of the spring 110 and a nut 132 is threaded onto the threaded end 118 of the rod 116. As will be described below, the nut 132 is tightened until the spring 110 is compressed to place a desired tension in the drive belt 56. The other spring-biased rear engine mount 140 of FIG. 4 is constructed in a similar manner and functions to also place the desired tension in the drive belt 56. The reverse operations can be carried out to easily and quickly disconnect the back of the engine 10 from the frame 12.

Because utility generators 14 can produce upwardly of 250 kilowatt of AC power, a substantial tension in the ribbed drive belt 56 is necessary to prevent slipping. In the preferred embodiment, the belt tension is about 2,400 pounds. As such, the drive belt 56 requires more than the weight of the rear portion of the engine 10 to tension it properly so that it does not slip on the ribbed pulleys 88 and 90. In addition to the weight of the rear portion of the engine 10, the drive belt 56 is further tensioned by the spring-biased rear engine mounts 122 and 140.

During installation of the engine 10 in the frame 12, the cage 86 is fastened to the bell housing 80, with the drive belt 56 and the engine pulley 88 situated in the cage 86. This engine assembly is then moved backwardly in the frame 12 until it is positioned correctly, and then the top loop of the drive belt 56 is placed over the generator pulley 90. The engine is then lowered sufficiently to attach the front engine mounts to the block 40 of the engine 10. The weight of the back of the engine 10 is thus suspended from the pulley 90 of the generator 14 by the drive belt 56. The springs of the rear engine mounts 122 and 140 are compressed to further tension the drive belt 56, while at the same time the front engine mount turnbuckles 42 and 44 are adjusted to maintain alignment of the engine 10 with the generator 14. In practice, the desired belt tension is achieved before the lateral plate member 96 contacts the frame members 112 and 114. As such, the rear of the engine 10 is not rigidly fastened to the frame 12. Rather, the back of the engine 10 is suspended with respect to the frame, with the drive belt 56 lifting the rear of the engine 10, and the springs of the rear engine mounts 122 and 140 biasing the rear of the engine 10 down. It can be appreciated that the stable position of the engine pulley 88 is directly under the generator pulley 90.

While the springs 110 can be employed for mounting the rear of the engine 10 to the frame members 112 and 114, those skilled in the art may prefer to rigidly mount the engine 10 to the frame members 112 and 114. This can be accomplished, for example, by using one or more shims between the lateral plate member 96 and the respective frame members 112 and 114. The appropriate number of shims can be used to level the engine 10 and to achieve the proper tension on the drive belt 56.

FIG. 4 illustrates the manner in which the right, back of the engine 10 is attached to the frame members 112 and 114 and thus to the other I-beam 22 part of the frame 12. As noted above, a rod and eye arrangement 140 of the same construction as that described in connection with FIG. 3 is utilized on the left side of the engine 10 to fasten the back of the block 40 to the frame 12. In order to disconnect the back of the engine 10 from the frame 12, one must simply remove the nuts 132 from the top of the springs, remove the top washer 134 and the spring 110, and swing or rotate the top of the rod 118 out of the respective slots 106 so that the lateral plate member 96 can be lifted with the engine 10 off the frame 12. With the rods 118 rotated out of the respective slots 106, the back of the engine 10 is supported only by the drive belt 56. It can be appreciated that when removing the engine 10, it is not necessary to also remove the generator 14. The engine 10 is removed as an assembly together with the cage 86, the engine shaft pulley 88 and the drive belt 56. It can also be appreciated that the installation/removal procedure is the same irrespective of whether the drive mechanism is a belt, chain or gears.

As noted above, the front of the engine 10 can be disconnected from the frame 12 by simply removing the two bolts 52 and 55 so that the turnbuckles 42 and 44 are disconnected from the front of the engine 10. With these simple operations, the engine 10 is quickly disconnected from the frame 12 and can be removed in a matter of minutes. Obviously, before the bolts 52 and 55 are disconnected and removed, the weight of the front of the engine 10 should be supported with a forklift via the tangs inserted into the horizontal tubular members 60 and 66.

While not shown, connected to the engine 10 are numerous electrical and mechanical apparatus which must be disconnected before the engine 10 can be removed from the frame 12. As such, the electrical wires can be attached to quick-disconnect connectors to connect and disconnect the electrical wires quickly. The fuel line can also be equipped with a quick-disconnect connection so that no bolts are required. The exhaust system and the coolant circulation system can also be equipped with quick-disconnect apparatus so that the same can be connected and disconnected in a short period of time. It is expected that the engine 10 can be disconnected from the frame 12 and a new replacement engine can be installed within one half hour to one hour. If desired, a flywheel can be mounted to the shaft 92 of the generator 14 in order to provide a more constant rpm in response to abrupt changes in the electrical load.

Figures 6, 7, 8:
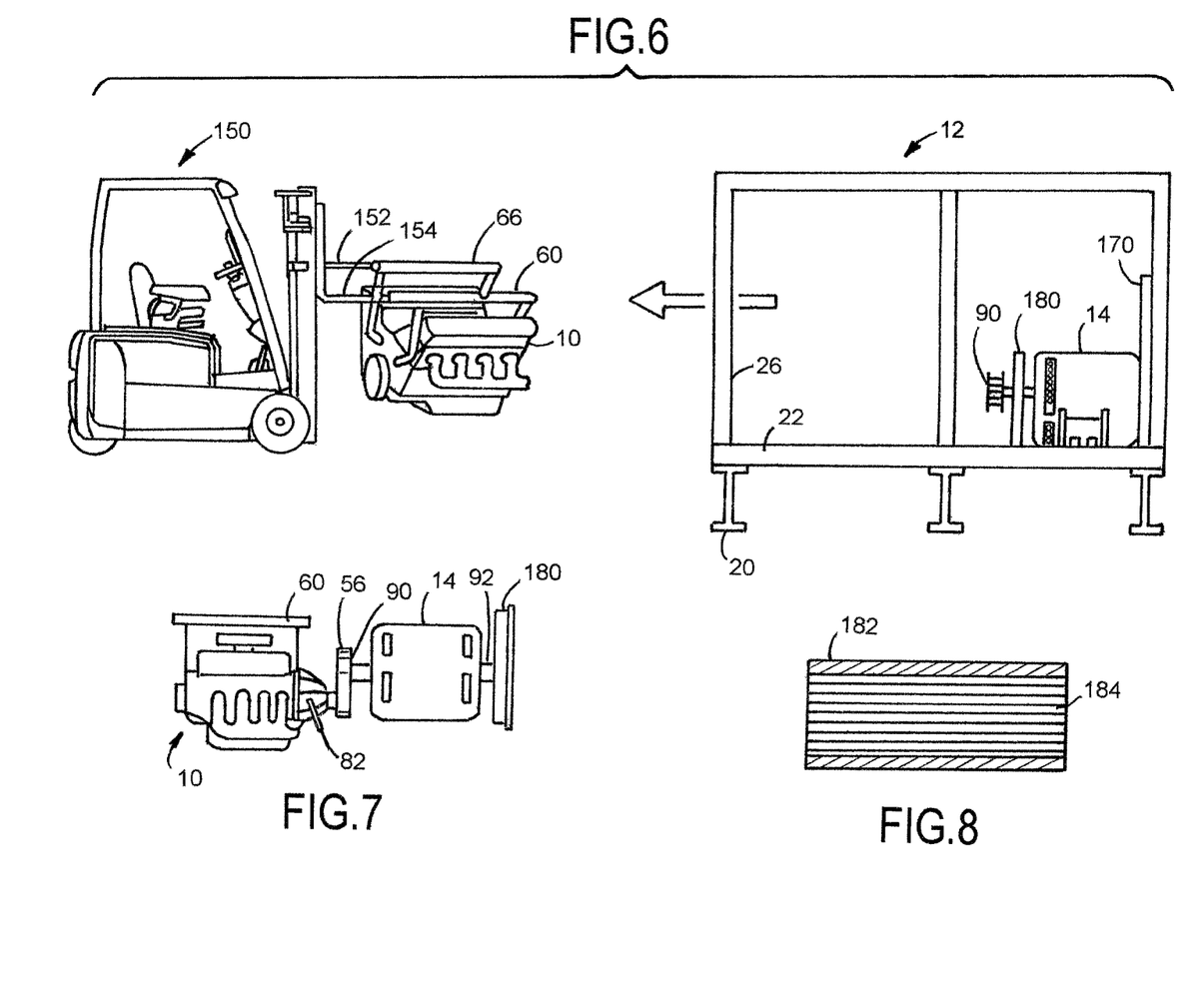
FIG. 6 is an isometric view of the engine being removed laterally from a generator unit.
FIG. 7 illustrates the engine/generator system equipped with a flywheel.
FIG. 8 illustrates a splined connector for connecting the engine crankshaft to the generator shaft.

Referring to FIG. 6, illustrated is the operation and equipment for removing the engine 10 from the frame 12. A forklift 150 can be used with rod tines 152 and 154 to lift the engine 10 from the unit and move it to a location where it can be loaded on a truck or the like. As noted above, the tines 152 and 154 are inserted into the open ends of the respective horizontal tubular members 60 and 66 while the engine is yet mounted to the frame 12. The forklift operator then lifts the tines only enough so that the front turnbuckle bolts 52 and 55 can be removed. The back spring-loaded nuts 132 are then also removed, as are all of the quick-disconnect wires, fuel lines and hardware. The forklift operator can then lift the engine 10 more until the top loop of the drive belt 56 can be removed from the generator pulley 90. The engine 10 can then be moved forwardly from the front of the frame 12, as shown in FIG. 6. The reverse operations can be carried out to install a replacement engine in the frame 12. While round tubular members 60 and 66 are illustrated, rectangular-shaped tubular members can be mounted to the engine for allowing conventional forklift tines to be inserted therein.

According to another feature of the invention, a clutch is employed to operationally connect and disconnect the engine 10 from the generator 14. As noted above, the clutch is operated in a conventional manner by the lever 82, shown in FIG. 4. Rather than operating the clutch manually, the clutch is operated by a processor, controller or computer. The lever 82 is spring biased in the engaged condition by a spring 160 attached at one end thereof to the block 40 or bell housing 80 of the engine 10. The end of the clutch lever 82 is also connected by a small cable 162 to the spindle 164 of a reversible DC motor 166. The motor 166 is fastened to the lateral frame member 96 by bolts. As the motor 166 causes the spindle 164 to rotate in one direction, the cable 162 wraps around the spindle 164 and pulls the lever 82 so that the clutch is disengaged. When the motor 166 is operated so that it rotates in the opposite direction, the cable 162 unwraps from the spindle 164 and the spring 160 pulls the lever 82 back until the clutch is disengaged. Importantly, the speed with which the motor is operated determines the rate at which the clutch is engaged and disengaged.

The computer can be programmed to control the rate of clutch engagement and disengagement, which may be different. It can be appreciated that the clutch can be disengaged rather quickly to disconnect the generator 14 from the engine 10. However, the engagement of the clutch to connect the engine 10 to the generator 14 so that the generator 14 delivers electrical power to the load, may require a longer period of time so that there is a smooth transition of the generator 14 from a stopped condition to 1800 rpm. Indeed, a tachometer can be attached to the generator 14 to monitor the speed thereof and to adjust the clutch engagement accordingly. In other words, the clutch engagement is gradual so that it slips less and less until the generator 14 is rotating a full speed, whereupon the clutch is fully engaged. The computer can be programmed to control the voltage or pulse rate to the DC motor 166 via the wires 168 to control the rate of rotation of the spindle 164 and thus the rate at which the lever 82 is moved and thus the degree of clutch engagement.

Attached to the back of the generator 14 is an electrical control panel 170 (FIG. 6), which could be fastened to the frame 12 of the generator unit 8. The electrical control panel 170 houses all of the electrical circuits that are needed to operate and control the engine 10 and the generator 14. Included in the control panel 170 are the circuit breakers that connect the output of the generator 14 to the load. A computer, controller or processor and associated printed circuit boards are also housed in the control panel 170. The printed circuit board includes the processor, memory and associated interface circuits for receiving inputs from sensors and for producing signals for controlling various parameters of the engine 10, including monitoring and recording the oil pressure, fuel pressure, temperature, rpm, speed, clutch, hours of operation, etc. The system can be equipped with video cameras to capture images of the environmental surroundings in order to monitor the safety and security of the system. The video images and audio sounds can be recorded by the computer. The processor is programmed to start the engine 10 when a switch is operated, and the engine 10 is run for a while with the clutch disengaged until the engine parameters are checked to verify correct operation, whereupon the clutch is gradually engaged to couple the generator 14 to the engine 10. The processor also monitors the voltage and load current supplied by each leg of the electrical output of the generator 14. If an overload is detected by the processor, then heavy duty relays are deactivated to disconnect the load from the generator 14.

As noted above, the engine/generator unit 8 can be equipped with a flywheel, in addition to the engine flywheel, to provide kinetic energy to the system to assist in providing additional torque to the generator 14 during short periods of electrical surge conditions. The flywheel equipped system is illustrated in FIG. 7. The flywheel 180 can be connected at different locations in the system. In the illustrated embodiment, the flywheel 180 is connected to the generator shaft 92 that extends through the back of the generator 14, on the side opposite the pulley 90. The flywheel 180 can be located in front of the generator 14 as well, adjacent to the pulley 90, or to the engine drive shaft. As can be appreciated, with this arrangement, the engine 10 does not have to be rated with the horsepower necessary to handle the electrical surges, as the flywheel 180 can provide the instantaneous driving torque to drive the generator 14 during such surges. As a result, an engine 10 with less horsepower can be utilized.

The flywheel-equipped engine/generator system includes a clutch 82, described above. The friction type clutch 82, or other type of clutch, allows easy startup of the system. It can be appreciated that a heavy flywheel cannot be rotated from a stopped condition to full speed instantly. The system startup is accomplished by starting the engine 10 and letting it warm up and become fully operational. The idle speed is set to a low rpm, such as 750 rpm to 1,000 rpm, and then the clutch is engaged in a periodic manner to slowly increase the rpm of both the generator 14 and the flywheel 180, without excessive slipping of the clutch 82. When the engine 10, the generator 14 and the flywheel 180 are rotating at the idle speed of the engine 10, then the rpm of the engine is increased to the rpm where the generator 14 is producing electrical energy at the desired frequency. The electrical load can then be applied to the generator 14, and the control system thereafter constantly adjusts the delivery of fuel to the engine to drive the generator 14 with varying electrical loads at a constant rpm. Again, should a sudden electrical surge be applied to the generator 14, the flywheel 180 provides the requisite torque to maintain the generator 14 at the desired rpm during the surge interval.

When employing a flywheel 180 in the unit 8, the flywheel 180 can also be used as a mechanism to rotate the engine crankshaft to initially start the engine 10. Here, the outer periphery of the flywheel 180 can be equipped with teeth that engage with the gear of a starter engine or motor. This is advantageous when the engine 10 and the generator 14 are significantly large and a separate small-size engine is used to start the primary engine 10. The starter engine (not shown) can be a diesel, gas or gasoline engine that is used only during the periods when the primary engine 10 is started. During the starting procedure, the starter engine will be started with a separate clutch engaged, and when the starter engine is warmed up, the separate clutch can be disengaged so that the flywheel 180, the generator 14 and the primary engine 10 are all rotated until the primary engine 10 starts. When the primary engine 10 has started, the starter engine is decoupled by disengaging the separate clutch, and then the starter engine is shut off.

Alternatively, the engine clutch 82 can be engaged to disconnect the primary engine 10 from the generator 14, and then the starter engine can be used to bring the generator 14 and the flywheel 180 up to operating speed, whereupon the starter engine can be disconnected from the flywheel 180. Then, the engine clutch 82 can be slowly disengaged so that the kinetic energy of both the flywheel 180 and the generator 14 drives the primary engine 10 to start it. The primary engine 10 can then drive the generator 14 and flywheel 180 in the manner described above.

Those skilled in the art may prefer to dispense with the flywheel 180, in which event the clutch 82 may also be eliminated. The generator 14 will then be spun up to operating speed in direct proportion to the rpm of the engine 10. However, the clutch 82 can be utilized to bring the generator 14 (without a flywheel 180) up to operating speed by periodically engaging the clutch 82 until the generator rpm is the same as the engine rpm, and then fully disengaging the clutch 82 so that the engine 10 can be gradually increased in speed up to the operating rpm of the generator 14.

FIG. 8 illustrates a splined coupler 182 for direct coupling the engine 10 to the generator 14. In those situations where it is desired to drive the generator 14 at the same rpm as the engine 10, a direct coupling therebetween can be utilized, but yet allow easy decoupling between the components. The splined coupler 182 can be constructed as a tubular member with internal splines 184 that match the splines of both the output shaft of the engine 10 and the generator shaft 92. While the splines 184 at each end of the coupler 182 are of the same type and size in the drawing, the coupler 182 can be constructed to accommodate different size engine output shafts and generator shafts, as well as different sizes of the respective splines 184. The coupler 182 should be constructed so that it can be allowed to slide longitudinally fully onto one of the shafts to be connected together. For example, the splined coupler 182 should be allowed to be slid longitudinally fully onto the engine shaft so that the engine 10 can be lifted without moving the generator 14. With this arrangement, the engine 10 can be removed laterally out of the frame 12 and replaced or repaired with another engine without having to unbolt and also remove the generator 14. This facilitates the repair and maintenance of the engine/generator system 8. The splined coupler 182 can be fixed against longitudinal movement on the splined shafts by using set screws, or C-shaped retainer rings engaged within respective grooves formed in the splined shafts.

While the preferred and other embodiments of the invention have been disclosed with reference to specific engine mounting apparatus, and associated methods thereof, it is to be understood that many changes in detail may be made as a matter of engineering choices without departing from the spirit and scope of the invention, as defined by the appended claims.

What is claimed is:

1. An engine and electrical generator, comprising:
   a frame to which said engine is fastened and to which said electrical generator is fastened;
   said electrical generator having a shaft to which a first rotatable driver is attached, said first rotatable driver for rotating the shaft of said electrical generator;
   said engine having a drive shaft generating a torque, said engine having a second rotatable driver that is rotated by the torque of said engine drive shaft, said first rotatable driver located above said second rotatable driver;
   a drive connector for connecting said first rotatable driver to said second rotatable driver so that said engine drives said electrical generator, a weight of a rear part of said engine is suspended from and supported by said drive connector, whereby the weight of the rear part of said engine places a tension on said drive connector;
   a cage functioning as an engine mount for the rear part of said engine, said cage for supporting the rear part of said engine in a spring-loaded manner with respect to said frame;
   a pair of compression springs, each said compression spring operating between said cage and said frame, and each said compression spring having a compression that is adjustable so that an increased compression of said compression springs increases the tension of said drive connector;
   said cage attached to a rear part of said engine and said cage is removably attached to said frame; and
   a frontal engine mount for mounting a front of said engine to said frame, said frontal engine mount adapted for allowing removal of the front of said engine from said frame.

2. The engine and electrical generator of claim 1, wherein said drive connector comprises one of a belt, a chain or gear teeth.

3. The engine and electrical generator of claim 1, wherein said second rotatable driver is connected directly to said engine drive shaft.

4. The engine and electrical generator of claim 1, wherein said first rotatable driver is connected directly to said electrical generator shaft.

5. The engine and electrical generator of claim 1, further including one or more horizontal tubular members attached to said engine, said one or more horizontal tubular members adapted for inserting therein tines of a forklift to lift said engine after said engine is disconnected from said frame.

6. The engine and electrical generator of claim 5, further including one or more arms that connect said engine to said one or more horizontal tubular members.

7. The engine and electrical generator of claim 6, wherein a first said arm is connected to a front right of said engine and a second said arm is connected to a rear right of said engine, and a third said arm is connected to a left front of said engine and a fourth said arm is connected to a left rear of said engine, and further including a first said horizontal tubular member connected between said first and second arms, and including a second said horizontal tubular member connected between said third and fourth arms.

8. The engine and electrical generator of claim 1, wherein a weight of the frontal part of said engine is supported by said frame, and wherein said frontal engine mount comprises a first turnbuckle attaching a front right of said engine to said frame, and comprises a second turnbuckle attaching a left front of said engine to said frame, said first and second turnbuckles adapted for adjusting a position of the front of said engine with respect to said frame.

9. The engine and electrical generator of claim 1, further including a flywheel that provides torque to said electrical generator during electrical load surges.

10. The engine and electrical generator of claim 9, further including a clutch that is engageable for disconnecting said engine from said flywheel so that said engine can be started without driving said flywheel.

11. The engine and electrical generator of claim 10, further including a motor coupled to a lever of said clutch, and operation of said motor moves said lever to engage and disengage said clutch.

12. The engine and electrical generator of claim 11, wherein said motor is reversible, and further including a programmed processor for controlling a rotational speed of said motor, wherein the clutch is disengaged at a rate different from engagement of the clutch.

13. The engine and electrical generator of claim 9, wherein said flywheel is connected to said electrical generator shaft.

14. The engine and electrical generator of claim 1, wherein said cage, said second rotatable driver and said drive connector are removed with said engine when said engine is removed from said frame and from said electrical generator.

15. An engine and electrical generator unit, comprising:
   an electrical generator for supplying electrical energy to a load, said electrical generator driven by an electrical generator pulley;
   an engine having a driveshaft and an engine pulley, said engine providing torque for driving said electrical generator;
   said electrical generator pulley located above said engine pulley;
   a drive belt connecting the engine pulley to said electrical generator pulley, whereby the torque of said engine drives said electrical generator to provide electrical energy to the load;
   a frame to which said electrical generator is rigidly mounted, a front of said engine is rigidly mounted to said frame and prevented from rotational movement of said engine when said engine delivers torque to said electrical generator;

a cage mounted to a rear part of said engine, and said cage functioning as a rear engine mount so that said drive belt supports a weight of the rear part of said engine; and said cage mounted to said frame with a pair of compression springs so that when a compression force of each said spring is increased, the tension of said drive belt is increased beyond the tension placed on said drive belt by the weight of the engine.

16. The engine and electrical generator of claim 15, wherein said compression springs are arranged so that when compressed, the rear part of the engine is forced downwardly to increase tension on said drive belt.

17. The engine and electrical generator of claim 15, further including frontal engine mounts for mounting a frontal portion of said engine to said frame, and wherein said engine is removable from said frame by disengaging the compression springs and by disconnecting the frontal engine mounts from said engine.

18. The engine and electrical generator of claim 15, wherein said cage is constructed with a slotted member on opposite lateral sides thereof, and further including a pair of threaded bolts, each said threaded bolt having one end rotationally attached to said frame, and an opposite threaded end of each said bolt can be pivoted into the slot of a respective slotted member, a respective said threaded bolt extending through each said compression spring, and each said compression spring located between a respective said slotted member and a respective nut threaded onto an end of a respective said threaded bolt, wherein adjustment of each said nut adjusts the compression of the respective said springs.

19. An engine and electrical generator, comprising:

a frame to which said engine is fastened and to which said electrical generator is fastened;

said electrical generator having a shaft to which a first rotatable driver is attached, said rotatable driver for rotating the shaft of said electrical generator;

said engine having a drive shaft generating a torque;

a cage attached to a rear part of said engine and said cage is removably attached to said frame, said cage housing a second rotatable driver that is rotated by the torque of said engine drive shaft, said cage can be removed from said frame to allow disengagement of said engine from said electrical generator;

a drive connector for connecting said first rotatable driver to said second rotatable driver so that said engine drives said electrical generator;

a frontal engine mount for mounting a front of said engine to said frame, said frontal engine mount adapted for allowing removal of the front of said engine from said frame;

a clutch that is engageable for disconnecting said engine from said electrical generator so that said engine can be started without driving said electrical generator;

a reversible motor coupled to a lever of said clutch, and operation of said motor moves said lever to engage and disengage said clutch; and a programmed processor for controlling a rotational speed of said motor, wherein the clutch can be disengaged at a rate different from engagement of said clutch.

20. The engine and electrical generator of claim 19, further including a flywheel connected to the shaft of said electrical generator.

* * * * *